A. W. CHAMBERLIN.
TYPE BAR AND BEARING THEREFOR.
APPLICATION FILED AUG. 10, 1908.
913,199.                                    Patented Feb. 23, 1909.
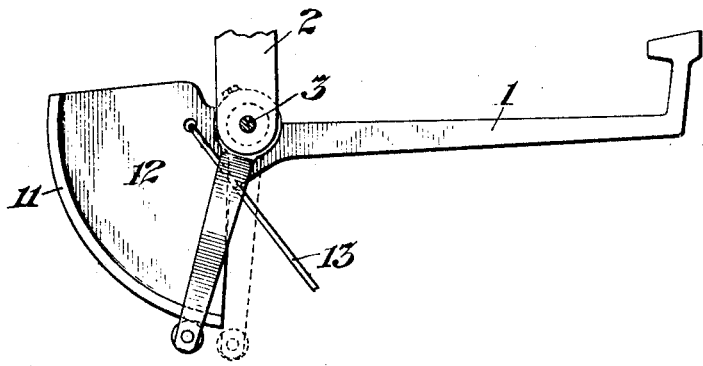
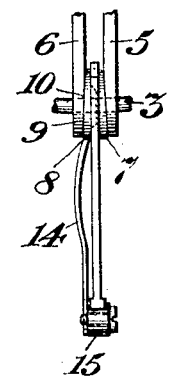
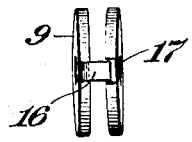
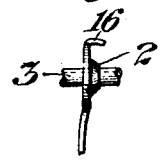
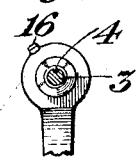
Witnesses
Chas. F. Clagett
Inventor
Arthur Webber Chamberlin
By his Attorney
George C. Dean

UNITED STATES PATENT OFFICE.

ARTHUR WEBBER CHAMBERLIN, OF NEW YORK, N. Y.

TYPE-BAR AND BEARING THEREFOR.

No. 913,199.

Specification of Letters Patent.

Patented Feb. 23, 1909.

Application filed August 10, 1908. Serial No. 447,763.

*To all whom it may concern:*

Be it known that I, ARTHUR WEBBER CHAMBERLIN, a citizen of the United States, and a resident of New York city, borough of Brooklyn, county of Kings, and State of New York, have invented certain new and useful Improvements in Type-Bars and Bearings Therefor, of which the following is a specification.

My invention relates to bearings for type bars or similar devices requiring accurate alinement, and the principal object is to produce a device of this class, in which the bearing is adapted to be automatically tightened by movement of the type bar whenever it works loose.

The nature of the invention will be more fully understood from a detailed description thereof in connection with the accompanying drawings, in which—

Figure 1 is a side elevation and Fig. 2 an end elevation of the type bar, bearing and hanger; Fig. 3 is a detail view of the adjusting cams for tightening the bearing; Figs. 4 and 5 are respectively edge view and face view of one of the adjusting face cams and the cone bearing associated therewith.

The type bar 1 is pivoted on adjustable cone bearing 2 which is mounted upon the grooved wire 3, and secured from rotation with respect thereto by a key or projection 4. The wire 3 is, in turn, supported by the hangers 5, 6. The type bar 1 may be of any known or desired construction, and is preferably formed from sheet steel. The hangers 5, 6, may form part of a slotted steel segment carrying all of the bearings of the typewriter. As suggested by the showing in Fig. 2, the slotted wire 3 may be continuous and extend through and form the support for adjacent bearings of the various type bars. The bearing surface of the type bar is held in engagement with the cone 2 by the coöperating washer 7, while the cone itself is held in position by a washer 8.

In order to adjust the position of the cone 2 with respect to the type bar and the washer 7, when it is desired to tighten the bearing to prevent play of the type bar, the washer 8 is provided on its rear side with a beveled surface 9, engaging a corresponding beveled portion 10 of the hanger 6. The width of the slot between hangers 5 and 6 and the thickness of the washers 7, 8 and of type bar 9, are so proportioned that with the parts in the position shown, any rotary movement of the cam washer 8 will cause the cam surfaces 9, 10, to force the cone 2 to the right in Fig. 2, thereby tightening up the bearing.

Any known or desired means may be employed for adjusting the cam 9. Preferably, however, the means is automatic, the tightening action being brought into operation when needed to the extent needed. Preferably, tightening movement is effected by movement of the type bar as the typewriter is operated, and preferably the movement of the type bar is caused to take effect upon the tightening means by some displacement of the type bar which results from looseness of the bearing. The particular direction of displacement of the type bar which is caused by the looseness of the bearing, may be a lateral displacement, such as set forth in my prior application, Serial No. 424,211, filed March 30th, 1908. In my present application, however, the tightening relation results principally from the radially eccentric position which the type bar assumes when the cone bearing is loose. The means employed in the present case consists of a segmental circular bearing face 11 rigid with the type bar and preferably formed by the integral extension 12. The circular segment 11 is preferably exactly concentric with the bearing face of the type bar. From such a construction, it results that if the cone bearing 2 loosens, the segment 11 will no longer be concentric with the axis 3, but being pulled downwardly by the operating link 13, when the operating key is depressed, the segment becomes slightly eccentric with respect to 3. This eccentricity of the segment 11 is utilized to rotate the adjusting cam 8 through the instrumentality of a radial arm 14 projecting therefrom and carrying an antifriction roller 15 bearing upon said segment 11. When the bearing is tight, the segment 11 is at or near contact with the roller 15, but as soon as the bearing loosens, the pull of the link 13 serves to bring the segment 11 into more operative engagement with the roller 15, thereby applying sufficient power to rotate the cam 8 a slight distance. The proportion of parts is made such that the power applied through the segment 11, roller 15, and arm 14 will be sufficient to rotate the cam 8 the distance required to tighten the bearing, and thereby correct the eccentricity of surface 11 by bringing the bearing surface of the type bar bearing back into full engagement with cone 2, thereby restoring surface 11 to normal position concentric with axis 3. Having reached the concentric position, the segment 11 no longer bears forcibly on 15 and the bearing remains in its adjusted position until further wear causes sufficient looseness and eccentricity to again bring the segment 11 into contact with the roller 15 and thereby again tighten the cone 2. In actual practice, the adjustment above described seldom takes place in distinct, noticeable steps, but is rather a continuing tendency operating at all times to prevent any noticeable loosening of the bearing.

It will be noted that the power stroke wherein the key pulls link 18 to elevate the type tends to cause more forcible engagement of surface 11 with roller 15 than does the reverse movement. Hence, the tightening is normally progressive in one direction so long as the wear of the bearing continues. With face cams such as shown, any rotary movement of the cam in either direction, will operate to tighten up the bearing and an automatic tightening means operating by the reverse movement of the type bar could be used, if desired.

While the cam action of the washer 8 through surfaces 9, 10, as above described, is in many cases sufficient for the purpose, I prefer in certain cases to provide the washer 7 with a cam engagement with hanger 5, which engagement is preferably similar and symmetrical to the cam engagement at 9 and 10. In such case, the washer 7 is given a rotary adjusting movement with the washer 8 by means of a finger or projection 16, preferably formed integrally with 8 and extending across into engagement with the recess 17 in cam washer 7. The finger 16 is arranged at a sufficient radial distance from 3, so that the hub portion of the type bar does not engage therewith. In most cases I prefer the symmetrical arrangement, where the washers 7 and 8 are both cams, because the double adjustment of the two cams in opposite directions serves to maintain the lateral position of the type bar, whereas if one cam washer 8 only is used, to take up all of the wear, all of the lateral movement is applied to the cone 2, and this operates to shift the position of the type bar and thus impair the spacing of the letters.

While I have herein fully shown and described, and have pointed out in the appended claims certain novel features of construction, arrangement, and operation which characterize my invention, it will be understood by those skilled in the art that various omissions, substitutions, and changes in the forms, proportions, sizes, and details of the device and of its operation, may be made without departing from the spirit of my invention.

It will be understood that I have not attempted to show accurately the exact pitch desirable for the cam surfaces of washers 8, 9, or of cone 2, and in actual practice of the invention these will be determined and selected so as to insure efficient operation in accordance with the principles above laid down. Similarly, the proportions of the engaging surface 11, arm 14, and roller 15 may be varied particularly as to the width, radius, and circumferential extent of the surface 11. In determining and proportioning the precise dimensions of the parts, the radial distance of surface 11 from the axis of the bearing should be made such that the available power transmitted through said surface and roller 15, will be sufficient to overcome the friction of the various cam and bearing surfaces, to the extent necessary to tighten the bearing. Where an antifriction roller, such as 15, is provided, the power actually transmitted is very small, and hence the radius of the arm 14 should be proportionally greater than the radii of the cam surfaces and bearing surfaces to be moved thereby.

The expression "inclined or coned bearing surfaces" as used herein, is intended to cover any bearing surfaces formed and arranged to take up wear by adjustment longitudinally of the axis of the bearing. The cam for effecting the axial adjustment of the bearing to take up wear, is functional and has the characteristic feature of utilizing wedging action of an inclined surface to produce relative movements of the parts, and in this view, the term includes a true screw surface wherein the wedging surface is a spiral or a helix.

I claim:

1. A type bar and a bearing therefor, provided with an inclined or coned bearing surface, in combination with means for tightening said bearing by eccentricity of the type bar when the bearing is loose, substantially as described.

2. A type bar and a bearing therefor, provided with an inclined bearing surface, in combination with means for moving the bearing along the axis of the shaft to tighten said bearing, said means being actuated more forcibly according as the type bar becomes more eccentric by reason of looseness of the bearing, substantially as described.

3. A type bar and a bearing therefor, provided with an inclined or coned bearing surface, in combination with a cam, and means for tightening said bearing by eccentricity of the type bar when the bearing is loose, substantially as described.

4. A type bar and a bearing therefor, provided with an inclined bearing surface, in combination with a cam for moving the bearing along the axis of the shaft to tighten said bearing, and means whereby said cam is actuated more forcibly according as the type bar becomes more eccentric by reason of the looseness of the bearing, substantially as described.

5. A type bar and a bearing therefor, provided with an inclined or coned bearing surface, in combination with a face cam for tightening said bearing said cam, being actuated by eccentricity of the type bar when the bearing is loose, substantially as described.

6. A type bar and a bearing therefor, provided with an inclined bearing surface, in combination with a face cam for moving the bearing along the axis of the shaft to tighten said bearing, and means whereby said face cam is actuated more forcibly according as the type bar becomes more eccentric by reason of the looseness of the bearing, substantially as described.

7. A type bar and a bearing therefor, provided with an inclined bearing surface, in combination with a pair of cams for moving the bearing along the axis of the shaft to tighten said bearing, and means whereby said cams are actuated more forcibly according as the type bar becomes more eccentric by reason of the looseness of the bearing, substantially as described.

8. A type bar and a bearing therefor, provided with an inclined or coned bearing surface, in combination with a pair of cams for tightening said bearing said cams being actuated by eccentricity of the type bar when the bearing is loose, substantially as described.

9. A type bar and a bearing therefor, provided with an inclined or coned bearing surface, in combination with a pair of face cams for tightening said bearing and means whereby said cams may be adjusted by eccentricity of the type bar when the bearing is loose, substantially as described.

10. A type bar and a bearing therefor, provided with an inclined bearing surface, in combination with a pair of face cams for moving the bearing along the axis of the shaft to tighten said bearing, and means whereby said pair of face cams is actuated more forcibly according as the type bar becomes more eccentric by reason of the looseness of the bearing, substantially as described.

11. A type bar and a bearing therefor, provided with an inclined or coned bearing surface, in combination with a pair of cams symmetrically arranged one on each side of the said type bar for tightening said bearing and means whereby said cams are actuated by eccentricity of the type bar when the bearing is loose, substantially as described.

12. A type bar and a bearing therefor, provided with an inclined bearing surface, in combination with a pair of cams symmetrically arranged one on each side of the said type bar for moving the bearing along the axis of the shaft to tighten said bearing, and means whereby said cams are actuated more forcibly according as the type bar becomes more eccentric by reason of the looseness of the bearing, substantially as described.

13. A type bar and a bearing therefor, said type bar being formed with a circular segment concentric with the bearing surface thereof, in combination with coöperating means for tightening said bearing, said tightening means including a member maintained at a fixed distance from the axis of said bearing and adapted to be engaged by said circular segment when the latter becomes eccentric to the axis by reason of looseness of the bearing.

14. A type bar, a bearing therefor, and means for tightening said bearing, in combination with means for operating the tightening mechanism from the type bar movement, said means being brought into operative relation by radial or eccentric displacement of the type bar.

15. A type bar, bearing surface therefor, and cam surfaces for tightening said bearings, in combination with frictional driving means for rotating said cam by rotary movement of the type bar, the effective radii and areas of the bearing and cam surfaces being smaller than the effective radii and areas of the driving and frictional rotating means, in such proportion and to such extent that the driving effect of the power transmitted through the frictional driving surface is greater than the opposing effect of the friction of the bearing and cam surfaces.

16. A type bar, a bearing therefor, and means for tightening said bearing, in combination with means for frictionally actuating said tightening means by movement of the type bar.

Signed at New York city, in the county of New York and State of New York, this 28th day of July, 1908.

ARTHUR WEBBER CHAMBERLIN.

Witnesses:
GEORGE C. DEAN,
IRVING M. OBRIEGHT.